United States Patent
Sugaya

(10) Patent No.: US 7,715,688 B2
(45) Date of Patent: May 11, 2010

(54) BROADCAST RECEIVER AND RECORDING METHOD

(75) Inventor: Hiroshi Sugaya, Tokyo (JP)

(73) Assignee: Sony Corporation (JP)

( * ) Notice: Subject to any disclaimer, the term of this patent is extended or adjusted under 35 U.S.C. 154(b) by 818 days.

(21) Appl. No.: 10/504,345

(22) PCT Filed: Feb. 21, 2003

(86) PCT No.: PCT/JP03/01923

§ 371 (c)(1),
(2), (4) Date: Feb. 1, 2005

(87) PCT Pub. No.: WO03/071796

PCT Pub. Date: Aug. 28, 2003

(65) Prior Publication Data

US 2005/0123276 A1    Jun. 9, 2005

(30) Foreign Application Priority Data

Feb. 22, 2002    (JP)    ............... 2002-046047

(51) Int. Cl.
*G11B 15/04* (2006.01)
(52) U.S. Cl. ............... 386/94; 360/60; 348/460
(58) Field of Classification Search ............ 386/94, 386/46; 348/460; 725/20; 360/60
See application file for complete search history.

(56) References Cited

U.S. PATENT DOCUMENTS

| | | | | |
|---|---|---|---|---|
| 5,315,448 A | * | 5/1994 | Ryan | .............. 360/60 |
| 5,778,140 A | * | 7/1998 | Okamoto et al. | .............. 386/94 |
| 6,205,223 B1 | * | 3/2001 | Rao et al. | .............. 380/42 |
| 6,862,400 B1 | * | 3/2005 | Lee et al. | .............. 386/94 |
| 7,239,796 B2 | * | 7/2007 | Goto et al. | .............. 386/83 |
| 7,248,784 B1 | * | 7/2007 | Kori et al. | .............. 386/94 |
| 2001/0017828 A1 | * | 8/2001 | Yamada | .............. 369/47.12 |
| 2001/0028714 A1 | | 10/2001 | Ogino et al. | |
| 2002/0071648 A1 | | 6/2002 | Matsumura et al. | |
| 2003/0120942 A1 | * | 6/2003 | Yoshida et al. | .............. 713/193 |

FOREIGN PATENT DOCUMENTS

| | | |
|---|---|---|
| EP | 1081697 A | 3/2001 |
| EP | 1156486 A | 11/2001 |
| EP | 1302946 A | 4/2003 |
| JP | 10-247362 A | 9/1998 |
| JP | 2000-4422 A | 1/2000 |
| JP | 2002-10189 A | 1/2002 |
| WO | 03/005357 A | 1/2003 |

OTHER PUBLICATIONS

Supplementary European Search Report dated Sep. 12, 2008, issued in connection with corresponding European Application 03706995.2.

* cited by examiner

*Primary Examiner*—Thai Tran
*Assistant Examiner*—Mishawn Dunn
(74) *Attorney, Agent, or Firm*—Lerner, David, Littenberg, Krumholz & Mentlik, LLP

(57) ABSTRACT

A broadcast receiver is provided which can prevent recording of uncopyable contents without failing to record copyable contents. A copy information detecting unit (4) detects copy control information attached to contents. A discriminating unit (5) discriminates the copyability or uncopyability. The contents recorded in a user-unreadable recording unit (6) is transferred to a user-readable recording unit (7) only if copyable.

5 Claims, 5 Drawing Sheets

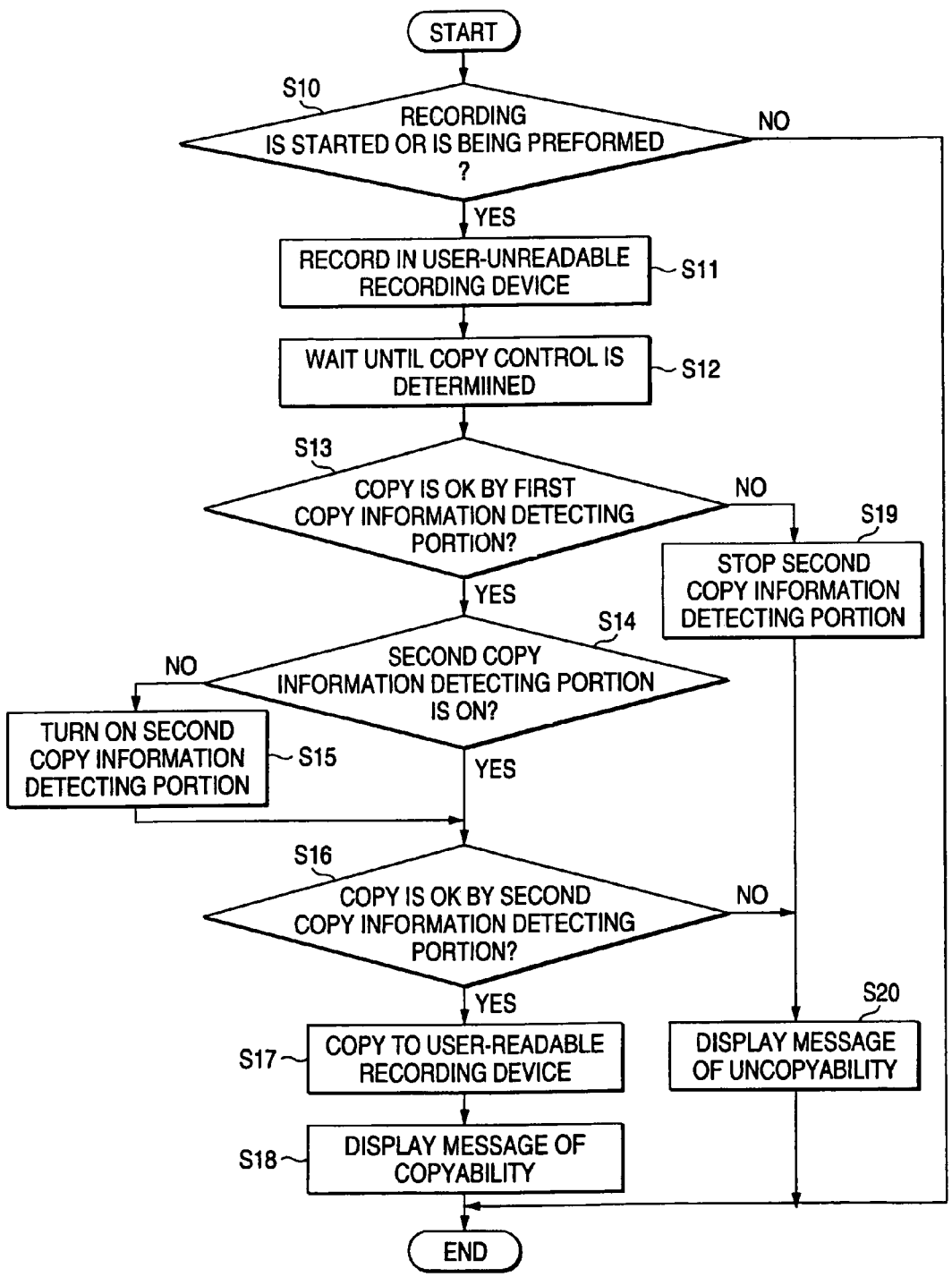

BROADCAST RECEIVER AND RECORDING METHOD

TECHNICAL FIELD

The present invention relates to a broadcast receiver for receiving broadcast contents and, in particular, to a broadcast receiver including a recording unit for recording broadcast contents.

BACKGROUND ART

With the development of recent digital technologies, fraud copies of video and/or audio contents in digital broadcasting have been increased. Therefore, the copyright protection has become important.

Conventionally, in order to prevent the fraud, Macrovision (where Macrovision is a trademark of MacroVision in the U.S.), CGMS (Copy Generation Management System)-A and so on exist as copy control systems for analog interfaces.

Macrovision is a copy guard system broadly used for commercially available video sources, satellite broadcasts and so on. Macrovision adopts a copy control method for preventing an output source from being normally recorded by causing AGC (Automatic Gain Control) of a video deck to malfunction.

CGMS-A adopts a copy control method for outputting contents having copy control information such as "copyable", "only one generation copyable" and "uncopyable".

On the other hand, for digital outputs to a digital video, for example, DTCP (Digital Transmission Copy Protection) is used, for example.

DTCP is a standard for encoding and exchanging data between digital devices connected by using IEEE-1394 (Institute of Electrical and Electronics Engineers 1394) and has a function for exchanging copy control information. Thus, controls for inhibiting copies and/or permitting the copy of one generation only are allowed.

Contents include copy control information thereof. The copy control information is detected by a copy control information detecting circuit of the broadcast receiver. Copyability and uncopyability thereof can be judged by a microcontroller. Signals output from a player such as a VTR (Video Tape Recorder) may also include copy control information.

However, a certain amount of time is required from the detection of copy control information to the judgement of copyability/uncopyability in order to prevent false detection due to noise, for example. When contents during the period is recorded in a storage device such as an HDD (Hard Disk Drive), uncopyable contents may be also recorded before a result from the judgement regarding copy control information is confirmed, which is a problem. On the other hand, once the recording starts after the judgement result is confirmed, video scenes and/or audio and data contents that a user needs to record may be missed, which is another problem.

Multiple copy control systems such as the CGMS-A and Macrovision may exist. In this case, the uncopyability is detected by one of copy control information detecting circuits and is judged by the microcontroller. Thus, the other copy control information detecting circuits are not required. However, due to the communication of detected data between the copy control information detecting circuits and the microcontroller, the processing performance of the microcontroller is reduced. In addition, in order to continue the detection, extra power is consumed in the copy control information detecting circuits, which is another problem.

When multiple copy control systems exist, priority may not be given to copy information detection. In this case, all of detection and judgement are always performed, and the processing becomes redundant thereby, which is another problem.

The present invention was made in view of these points. It is an object of the present invention to provide a broadcast receiver, which cannot play broadcast contents until the permission for copying thereof is determined.

DISCLOSURE OF THE INVENTION

In order to overcome these problems, according to the invention, there is provided a broadcast receiver having a recording unit for recording contents characterized by an input unit for receiving a command for recording the contents from a user, a contents receiving unit for receiving the contents, a copy information detecting unit for detecting copy control information including at least information relating to copyability or uncopyability of the contents from the contents, a discriminating unit for discriminating the copyability or uncopyability of the contents based on the copy control information, a user-unreadable first recording unit for recording the contents in accordance with the record command, and a user-readable second recording unit for receiving the contents from the first recording unit only when the contents is copyable.

Under this construction, contents recorded in the first recording unit in accordance with the record command is not transferred to the user readable second recording unit until the copyability is determined.

There is further provided a method for recording contents having copy control information including at least information relating to copyability or uncopyability, the method characterized by the steps of storing the contents in a user-unreadable first recording medium, discriminating the copy control information of the contents, transferring the contents to a user-readable second recording medium by the first recording medium if copyable, and not transferring the contents to the second recording medium by the first recording medium if uncopyable.

Under this method, contents recorded in the first recording unit in accordance with the record command is not transferred to the user readable second recording unit until the copyability is determined.

BRIEF DESCRIPTION OF THE DRAWINGS

FIG. 5 is a flowchart illustrating a recording method.

BEST MODE FOR CARRYING OUT THE INVENTION

An embodiment of the present invention will be described below with reference to drawings.

Figure 1:
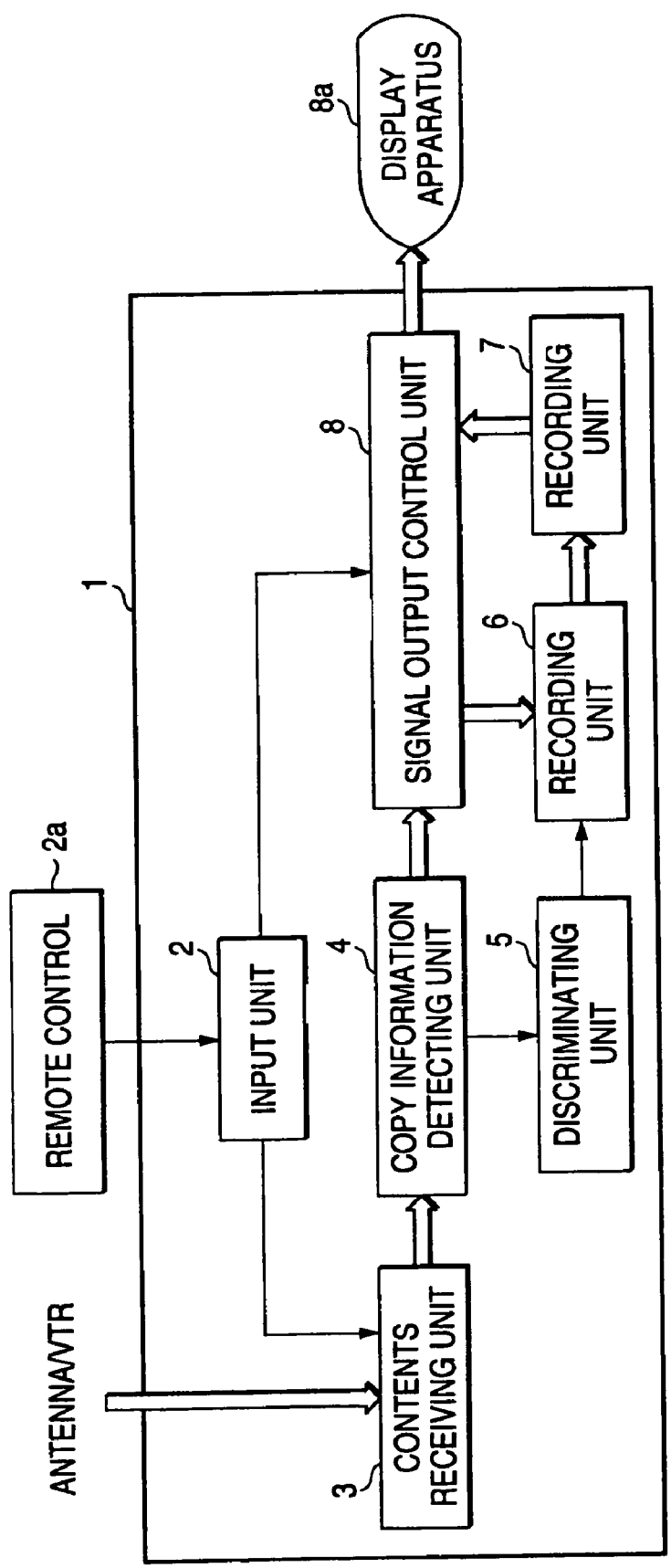
FIG. 1 is a configuration diagram of a broadcast receiver according to an embodiment of the present invention.

FIG. 1 is a configuration diagram of a broadcast receiver according to an embodiment of the invention.

A broadcast receiver 1 includes an input unit 2 receiving a command for recording or playing contents in response to an input by a user via a remote control 2a, a contents receiving unit 3 for receiving contents, a copy information detecting unit 4 for detecting, from contents, copy control information including information relating to at least copyability/uncopyability of the contents, a judging unit 5 for judging the copyability/uncopyability of broadcast contents based on copy control information, a user-unreadable recording unit 6 for recording broadcast contents in accordance with a record command, a user-readable recording unit 7 for receiving contents from the recording unit 6 only when the contents is copyable, and a signal output controlling unit 8 for selecting one of the copy information detecting unit 4 and the recording unit 7 and causing a display apparatus 8a to output broadcast contents.

An operation of the broadcast receiver 1 will be described below.

When the contents receiving unit 3 receives broadcast contents provided from a broadcast station or contents input from an external apparatus such as a VTR (Video Tape Recorder) the signal output control unit 8 outputs and plays the received contents to the display apparatus 8a through the copy information detecting unit 4.

Here, when a command for recording contents is input by a user's manipulation on the remote control 2a, the signal is received by the input unit 2. The signal output control unit 8 receives contents and transfers the contents to the recording unit 6. The recording unit 6 is user-unreadable, and the information of contents stored therein cannot be referred. Here, the signal output control unit 8 may output the contents to the display apparatus 8a.

Contents received by the contents receiving unit 3 include copy control information including information relating to the copyability/uncopyability for preventing fraud copies. This is detected by the copy information detecting unit 4 and is transferred to the judging unit 5.

The judging unit 5 judges whether the received contents is copyable or uncopyable with reference to the received copy control information. Here, if the copyability is judged, a command for transferring contents to the recording unit 7 is sent to the recording unit 6. The recording unit 6 transfers the contents to the recording unit 7. If the uncopyability is judged, the contents are not transferred from the recording unit 6 to the recording unit 7. Then, for example, the data recorded in the recording unit 6 is deleted.

The recording unit 7 can output contents to the signal output control unit 8. When a command for playing recorded contents is input by a user via the remote control 2a, the command is received by the input unit 2. The signal output control unit 8 displays on the display apparatus 8a the contents stored in the recording unit 7.

Figure 2:
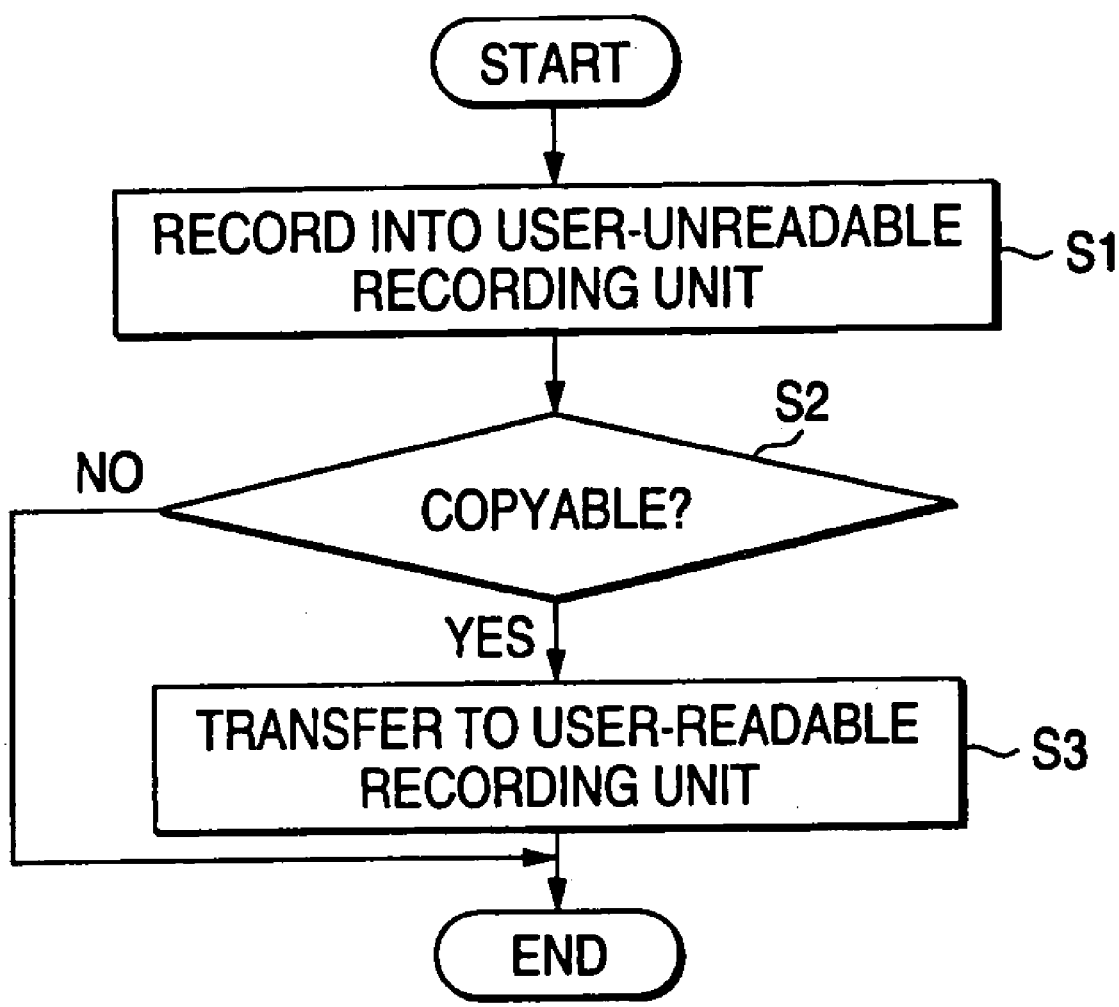
FIG. 2 is a flowchart illustrating a recording method.

FIG. 2 is a flowchart illustrating processing for recording contents.

When a command for recording contents is input by a user, the signal output control unit 8 records the contents into the user-unreadable recording unit 6 (S1). Next, copy control information attached to the contents detected by the copy information detecting unit 4 is judged with respect to the copyability/uncopyability by the judging unit 5. If copyable, the processing advances to a step S3. If uncopyable, the processing ends (S2). If the copyability is judged, the contents recorded in the user-unreadable recording unit 6 is transferred to the user-readable recording unit 7. Then, the processing ends (S3).

As described above, copy control information attached to contents is detected by the copy information detecting unit 4, and the copyability or uncopyability of the contents is judged by the judging unit 5. The contents recorded in the user-unreadable recording unit 6 is transferred to the user-readable recording unit 7 only when the contents is copyable. Thus, copyable contents can be recorded without delay.

Furthermore, uncopyable contents can be prevented from recording in the user-readable recording unit 7.

Details of this embodiment will be described below.

Figure 3:
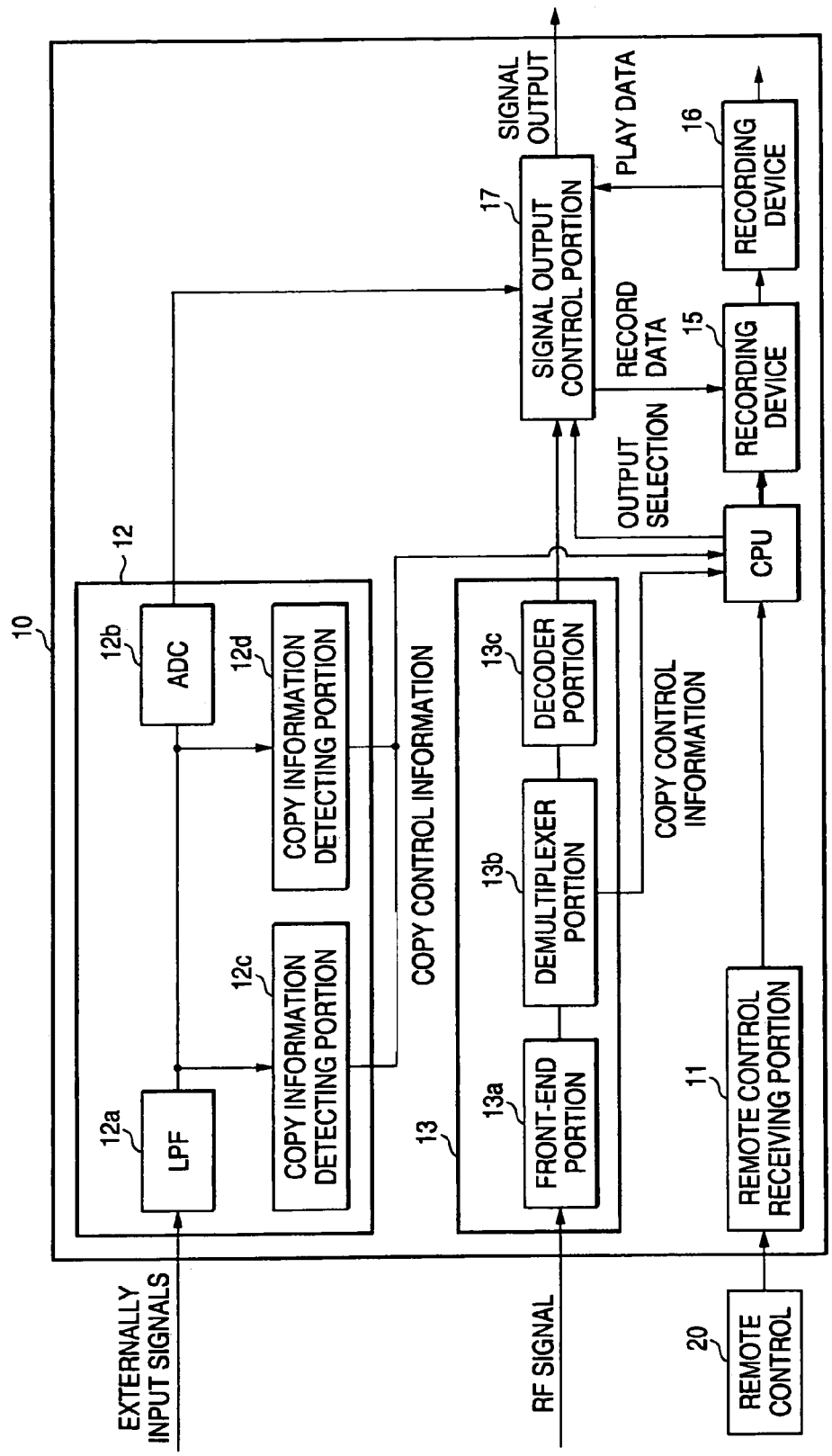
FIG. 3 is a hardware configuration diagram of a digital broadcast receiver.

FIG. 3 is a hardware configuration diagram of a digital broadcast receiver according to this embodiment of the invention.

A digital broadcast receiver 10 according to this embodiment of the invention includes a remote control receiving portion 11 for receiving a command input by a user through a manipulation of a remote control 20, an external signal input portion 12 for receiving analog external input signal from a VTR, for example, a digital broadcast receiving portion 13 for receiving a digital broadcast, a CPU (Central Processing Unit) 14 for receiving signals from the external signal input portion 12, the digital broadcast receiving portion 13 and the remote control receiving portion 11, a user-unreadable recording device 15 operating under the control of the CPU 14, a user-readable recording device 16, which is connected to the recording device 15, and a signal output control portion 17 operating in response to a command from the CPU 14 and outputting transferred contents to the recording device 15, a monitor (not shown) or the like.

Furthermore, the external signal input portion 12 includes a low-pass filter (LPF) 12a receiving externally input signals and an A/D (Analog/Digital) converter 12b, which are connected in series, and copy information detecting portions 12c and 12d connected to the A/D converter 12b in parallel. The A/D converter 12b is connected to the signal output control portion 17, to which a processed signal is output from the A/D converter 12b. The copy information detecting portions 12c and 12d are connected to the CPU 14 to which detected copy control information is output.

The digital broadcast receiving portion 13 includes a front-end portion 13a having a tuner (not shown), a demultiplexer portion 13b for demultiplexing TS (Transport Stream) signals, a decoder portion 13c for decoding encoded data, which are connected in series. The demultiplexer portion 13b is connected to the CPU 14 to which the copy control information separated and detected here is output.

Functions of the components will be described below.

The remote control receiving portion 11 receives a command input by a user via the remote control 20 through infrared rays and converts the command to the data in a format processable by the CPU 14.

The external signal input portion 12 will be described below.

The LPF 12a receives analog signals of contents from an external apparatus such as a VTR, not shown, and removes high frequency noise. The analog signals processed by the LPF 12a are transmitted to the A/D converter 12b and the copy information detecting portions 12c and 12d. The A/D converter 12b converts the analog signals to digital signals and transmits the digital signals to the signal output control portion 17. Copy control information attached to the contents is detected by the copy information detecting portions 12c and 12d. The detected copy control information is transmitted to the CPU 14.

CGMS-A and Macrovision are known as analog copy control systems. The copy information detecting portions 12c and 12d correspond to different copy control systems, respectively.

The digital broadcast receiving portion 13 will be described.

The front-end portion 13a receives and demodulates RF (Radio Frequency) signals. The demultiplexer portion 13b has a function demultiplexing multiplexed TS signals. Here, copy control information is also retrieved from the multiplexed TS signals. Demultiplexed audio and/or video signals are decoded by the decoder portion 13c and are output to the signal output control portion 17. The retrieved copy control information is transmitted to the CPU 14.

The CPU 14 reads the copy control information transmitted from the external signal input portion 12 or the digital broadcast receiving portion 13 and judges whether the received contents is copyable or uncopyable. Furthermore, in response to an input from a user, the CPU 14 controls the output selection of the signal output control portion 17.

The recording device 15 is a user-unreadable recording device and may be a semiconductor memory. Alternatively, a hard disk may be used, and an unreadable area may be provided therein.

Furthermore, the recording device 15 has a function temporarily recording contents transferred from the signal output control portion 17 as record data when a command for recording the contents is given from a user. Here, the recorded contents is transferred to the recording device 16 only when the CPU 14 gives a transfer command to the recording device 16.

The recording device 16 is a user-readable recording device and may be a hard disk.

The recording device 16 is connected to the user-unreadable recording device 15. If the contents is copyable, the recording device 16 receives the contents from the recording device 15 having received the command from the CPU 14. When a user gives a command for playing recorded broadcast contents, the recorded contents is output to the signal output control portion 17 in accordance with the output selection by the signal output control portion 17.

The signal output control portion 17 receives the contents from the external signal input portion 12 and the digital broadcast receiving portion 13 and selects signals to be output to a monitor (not shown) for example, in accordance with a command of the CPU 14. When a user gives a command for recording the contents, the signal-output control portion 17 transfers signals of received contents as record data to the recording device 15 under the control of the CPU 14. The signal output control portion 17 has a function for reading signals of contents recorded in the recording device 16 as play data and outputting the play data to a monitor (not shown), for example, under the control of the CPU 14 when a user gives the command for playing the contents.

An operation of the digital broadcast receiver 10 will be described below.

While digital broadcasting is being viewed, a digital broadcast received by the front-end portion 13a is demultiplexed by the demultiplexer portion 13b. The demultiplexed audio and video signals are decoded by the decoder portion 13c and are transferred to the signal output control portion 17. Then, the resulting signals are output to a display apparatus such as a monitor (not shown).

When analog signals of contents are received by the digital broadcast receiver 10 from a VTR, for example, connected thereto through a video terminal, high frequency noise is removed by the low-pass filter 12a. The processed data is converted to digital signals by the A/D converter 12b and are transferred to the signal output control portion 17. Then, the resulting signals are output to a display apparatus such as a monitor (not shown).

When a command for recording contents is given by a user through a manipulation on the remote control 20, the remote control receiving portion 11 sends a signal indicating the command to the CPU 14. The CPU 14 controls the signal output control portion 17 and transfers the signals of the contents transferred to the signal output control portion 17 to the recording device 15 as record data. With this, the CPU 14 having received copy control information of the contents retrieved by the demultiplexer portion 13b while digital broadcasting is being viewed or copy control information detected by the copy information detecting portions 12c and 12d for analog contents input from the external signal input portion 12 discriminates copy control information. Thus, the CPU 14 discriminates whether the received contents is copyable or uncopyable. Here, if determined as copyable, the CPU 14 gives a command for recording contents in the recording device 15 and transfers the temporarily recorded contents to the user-readable recording device 16. If determined as uncopyable, the contents is not transferred.

In this way, the contents transferred to and recorded in the recording device 16 can be played. When a play command is input by a user through a manipulation on the remote control 20, the remote control receiving portion 11 receives and transfers the signal indicating the command to the CPU 14. Under the control of the CPU 14, the signal output control portion 17 outputs, as a signal output, the signals of the contents recorded in the recording device 16 based on an output selection.

In this way, when a command for recording contents is given, the contents is temporarily recorded in a user-unreadable recording device. Then, copy control information attached to the contents is detected, and the copyability or uncopyability thereof is discriminated. Only if copyable, the contents is transferred to a user-readable recording device so that the copyable contents can be recorded without delay.

Control over the copy information detecting portions. 12c and 12d of the external signal input portion 12 will be described below.

Figure 4:
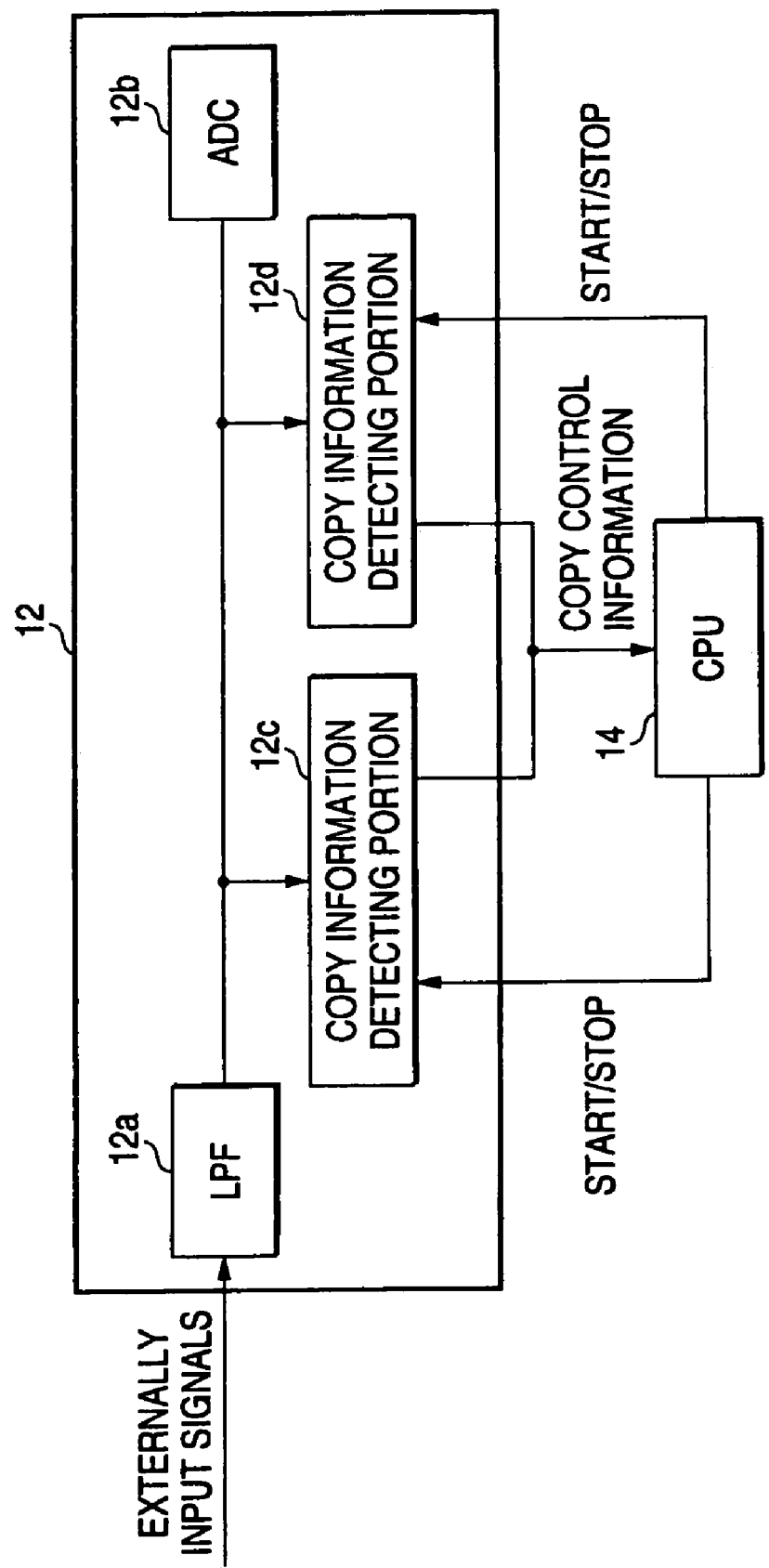
FIG. 4 is a diagram showing a state of control of a copy information detecting portion.

FIG. 4 is a diagram showing a state of control over the copy information detecting portions.

As shown in the figure, a structure is provided in which the CPU 14 is connected to the copy information detecting portions 12c and 12d through a control line for control or a shared bus such as I²C-bus (where I²C-bus is a trademark of PHILIPS ELECTRONICS N. V.). Thus, the CPU 14 controls the starting and stopping of operations by the copy information detecting portions 12c and 12d.

A method for recording contents input to the external signal input portion 12 will be described below which includes control over the copy information detecting portions 12c and 12d by the CPU 14.

FIG. 5 is a flowchart illustrating processing of the recording method.

S10: Determine Whether Recording is Started or is Being Performed

The CPU 14 determines whether a command for recording contents having been input to the external signal input portion 12 is given by a user through a manipulation on the remote control 20 or the contents is being recorded or not.

Here, if the recording is started or is being performed, the processing advances to a step S1. If no record commands are given by a user, the processing ends.

S11: Record in the User-Unreadable Recording Device

Under the control of the CPU 14, the signal output control portion 17 records contents having been input to the external signal input portion 12 to the user-unreadable recording device 15.

S12: Wait Until Copy Control is Determined

The CPU 14 discriminates whether the contents is copyable or uncopyable based on copy control information detected by the copy information detecting portion 12c. Since the determination regarding the copyability or uncopyability requires a certain period of time, the processing waits until the determination is confirmed. Upon confirmed, the processing advances to a step S13.

S13: Determine If the Copy is Ok or not by a First Copy Information Detecting Portion For example, the CGMS-A copy control system finishes determining copy control information earlier than that of the Macrovision copy control system. Therefore, the CGMS-A copy control system is handled as the first copy information detecting portion 12c. Here, if the result from the determination of the copy control information detected by the copy information detecting portion 12c under the control of the CPU 14 at the step S12 is "copyable", the processing advances to a step S14. If "uncopyable", the processing advances to a step S19.

S14: Determine Whether a Second Copy Information Detecting Portion is ON or Not.

The CPU 14 determines whether the copy information detecting portion 12d corresponding to a different copy control system from the one for the copy information detecting portion 12c is operating or not.

Here, if operating, the processing advances to a step S16. If not, the processing advances to a step S15.

S15: Turn On the Second Copy Information Detecting Portion.

Since it is determined at the step S14 that the copy information detecting portion 12d is not operating, the CPU 14 starts the operation of the copy information detecting portion 12d. For example, when the copy information detecting portion 12d corresponds to Macrovision, the detection of Macrovision signals is started. Then, the processing advances to the step S16.

S16: Determine If the Copy is Ok or not by the Second Copy Information Detecting Portion.

Here, the CPU 14 determines whether the contents input to the external signal input portion 12 is copyable contents or not based on the copy control information detected by the copy information detecting portion 12d. If copyable, the processing advances to a step S17. If uncopyable, the processing advances to a step S20.

S17: Copy to a User-Readable Recording Device

In the processing up to the step S16, it is determined that the signals of the contents having been input to the external signal input portion 12 are copyable. Thus, under the control of the CPU 14, the signals of the contents recorded in the user-unreadable recording device 15 are transferred to and recorded in the user-readable recording device 16. Then, the processing advances to a step S18.

S18: Display a Message Indicating the Copyability.

In the processing up to the step S16, it is determined that the signals of the contents input to the external signal input portion 12 is copyable. Thus, a message indicating the copyability is displayed on a display apparatus such as a monitor (not shown) under the control of the CPU 14. Then, the processing ends.

S19: Stop the Second Copy Information Detecting Portion.

As a result of the analysis of the copy control information detected by the copy information detecting portion 12c by the CPU 14 at the step S13, it is determined that the contents input to the external signal input portion 12 is uncopyable. Thus, the copy information detecting portion 12d does not have to operate. Therefore, the CPU 14 sends a stop signal to the copy information detecting portion 12d and stops the operation thereof.

S20: Display a Message Indicating the Uncopyability.

Since it is determined the contents is uncopyable from the step S13 or the step S16, a message indicating the uncopyability is displayed on a display device such as a monitor (not shown) under the control of the CPU 14. Then, the processing ends.

As described above, in accordance with a determination result regarding detected copy control information, the CPU 14 controls operations of the copy information detecting portions 12c and 12d. Thus, when multiple copy control systems exist, an operation of the copy information detecting portion, which does not have to detect copy control information, can be terminated. Therefore, the processing power of the microcontroller can be improved through communication of detected data with the microcontroller, and the power consumption in the copy information detecting portions can be reduced.

Furthermore, when multiple copy control systems exist, priority is given to copy information detection. Thus, processing for detection and discrimination can be simplified.

In the description above, priority is given to the determination on copy control information of the copy information detecting portion 12c but is not limited thereto.

The priority of control of the copy information detecting portions with respect to the contents input to the external signal input portion 12 was described above. However, priority may be determined for a case with the digital broadcast receiving portion 13, and a recording operation may be performed then.

In the description above, the two copy information detecting portions 12c and 12d are provided. However, two or more copy information detecting portions may be provided in accordance with three or more kinds of copy control system.

In the description above, the user-readable recording device 16 is provided in the digital broadcast receiver 10. However, an external apparatus may be provided which is connected to a user-unreadable recording device 15 through i. Link (where i. Link is a trademark of Sony).

In the description above, a stream of contents to be received by the digital broadcast receiver 10 is a TS but is not limited thereto. The same copy control can be achieved by inputting non-TS streams to the demultiplexer 13b.

As described above, according to the present invention, the copyability or uncopyability of contents is detected by a copy information detecting unit and is discriminated by a discriminating unit based on copy control information attached to the contents. The contents recorded in a user-unreadable recording unit is transferred to a user-readable recording unit only when the contents is copyable. Thus, the copyable contents can be recorded without delay.

Furthermore, uncopyable contents can be prevented from being recorded in a user-readable recording unit.

The invention claimed is:

1. A receiver having a recording unit for recording contents, said receiver comprising:
    an input unit for receiving a record command from a user;
    a contents receiving unit for receiving analog signals representative of the contents;
    a converter unit for converting the analog signals to digital signals representative of the contents;
    a first analog copy information detecting unit for detecting, prior to conversion of the analog signals, copy control information including at least information relating to copyability or uncopyability of the analog signals of the contents from the analog signals of the contents in accordance with a first copy control system, and for outputting a first copy control signal representative of the copyability or uncopyability responsive to the first analog copy information detecting unit detecting copy control information in accordance with the first copy control system;

a second analog copy information detecting unit for detecting, prior to conversion of the analog signals, the copy control information from the analog signals of the contents in accordance with a second copy control system, and for outputting a second copy control signal representative of the copyability or uncopyability responsive to the second analog copy information detecting unit detecting copy control information in accordance with the second copy control system, in which the first copy control system is different from the second copy control system and in which a priority is provided to one of the first analog copy information detecting unit and the second analog copy information detecting unit;

a discriminating unit for (i) discriminating the copyability or uncopyability of the contents based on the first and second copy control signals output from the first copy information detecting unit and the second copy information detecting unit, respectively, and for (ii) supplying a transfer command for transferring the contents when both of the first and second copy control signals indicate that the contents are copyable, in which the discriminating unit discriminates the copyability or uncopyability of the contents by first examining the first and second copy control signals from the one of the first analog copy information detecting unit and the second analog copy information detecting unit having the priority and thereafter examining the first and second copy control signals from the other one of the first analog copy information detecting unit and the second analog copy information detecting unit;

a signal output control unit for receiving, from the converter unit, the converted digital signals representative of the contents, and for outputting the converted digital signals for any of display and recordation;

a user-unreadable first recording unit for receiving and recording thereat the converted digital signals representative of the contents in accordance with the record command and for transferring the first recorded converted digital signals representative of recorded contents therefrom only after receipt of the transfer command; and a user-readable second recording unit for receiving and recording the first recorded converted digital signals representative of the contents transferred from the first recording unit in accordance with the transfer command, and for transferring the second recorded converted digital signals to the signal output control unit responsive to a request for the second recorded converted digital signals.

2. The receiver according to claim 1 further comprising a signal output control unit for inputting multiple input contents, selecting the input contents to be output in accordance with a selection by the user, and selecting the contents to be recorded in the first recording unit from the input contents.

3. The receiver according to claim 1 further comprising a stop unit for, when the copy control information from the one of the first analog copy control unit or the second analog copy information detecting unit having the priority is determined as uncopyable by the discriminating unit, stopping an operation of the other of the first analog copy control unit or the second analog copy information detecting unit.

4. The receiver according to claim 1, further comprising a display unit for displaying information relating to the copyability or uncopyability, which is determined by the discriminating unit.

5. A method for recording contents having copy control information including at least information relating to copyability or uncopyability, the method comprising:

converting analog signals representative of the contents to digital signals representative of the contents;

transferring the converted digital signals to an output signal control unit;

detecting, prior to converting the analog signals, the copy control information from analog signals representative of the contents by use of a first analog copy information detecting unit in accordance with a first copy control system, outputting a first copy control signal representative of the copyability or uncopyability responsive to the first analog copy information detecting unit detecting copy control information in accordance with the first copy control system;

detecting, prior to converting the analog signal, the copy control information from the analog signals representative of the contents by use of a second analog copy information detecting unit in accordance with a second copy control system, outputting a second copy control signal representative of the copyability or uncopyability responsive to the second analog copy information detecting unit detecting copy control information in accordance with the second copy control system; in which the first copy control system is different from the second copy control system and in which a priority is provided to one of the first copy control system and the second copy control system;

discriminating the copy control information of the contents based the first and second copy control signals output from the first analog copy information detecting unit and the second analog copy information detecting unit, respecitvely, in which the discriminating discriminates the copyability or uncopyability of the contents by first examining the first and second copy control signals output from the one of the first analog copy information detecting unit and the second analog copy information detecting unit having the priority and thereafter examining the the first and second copy control signals output from the other one of the first analog copy information detecting unit and the second analog copy information detecting unit;

outputting, from the output signal control unit, the converted digital signals for any of display and recordation;

receiving and storing the converted digital signals in a user-unreadable first recording medium;

supplying a transfer command signal for transferring the first recorded converted digital signals responsive to the first and second copy control signals output from both the first copy information detecting unit and the second copy information detecting unit indicating that the contents are copyable;

transferring the first recorded converted digital signals to a user-readable second recording medium from the first recording medium only in response to the transfer command;

not transferring the first recorded converted signals to the second recording medium from the first recording medium in the absence of the transfer command; and outputting, to the output signal control unit for display, the second recorded converted digital signals in response to a request for such second recorded converted digital signals.

* * * * *